Feb. 20, 1945.  F. E. BEST  2,370,000

MASTER COMPASS AND INERTIA MEANS

Filed Nov. 27, 1941  2 Sheets-Sheet 1

INVENTOR.

Feb. 20, 1945.   F. E. BEST   2,370,000
MASTER COMPASS AND INERTIA MEANS
Filed Nov. 27, 1941   2 Sheets-Sheet 2

Frank Ellison Best, INVENTOR.

Patented Feb. 20, 1945

2,370,000

UNITED STATES PATENT OFFICE 2,370,000

MASTER COMPASS AND INERTIA MEANS

Frank Ellison Best, Indianapolis, Ind.

Application November 27, 1941, Serial No. 420,732

9 Claims. (Cl. 33—222)

This invention relates to master compass and inertia means and an object of this invention is to provide a compass or an inertia device that has a very high degree of sensitivity and at the same time is of strong and durable construction.

Another object is to provide a master compass or inertia device in which control means is combined with a highly sensitive relatively movable member in such a manner as to make possible the control of heavier parts by the highly sensitive relatively movable member without interfering in any way with the sensitivity of said relatively movable member. In this connection it is to be noted that the highly sensitive member and the instrument are movable relative to each other regardless of whether the instrument moves around the highly sensitive member or the highly sensitive member moves in the instrument.

Another object of this invention is to provide an instrument of this nature in which light actuated devices are used in combination with a highly sensitive relatively movable member for controlling other mechanism without in any way affecting the sensitivity of the highly sensitive member.

Another object is to provide a master compass in which light actuated devices are used in combination with a magnetic member that is operated by the earth's magnetism for controlling other mechanism without making any connections that retard the action of the magnetic member.

Another object is to provide an inertia controlled device in which light actuated devices are used in combination with an inertia member for controlling the operation of other mechanism without in any way affecting the operation of the inertia member.

Another object is to provide an instrument which has embodied therein a member mounted on highly sensitive bearings that are carried by a folower rotatively mounted within the instrument, which follower has driving means controlled by the member and operable to actuate the follower in response to very slight relative rotary movement between the member and the follower whereby substantially all relative rotary movement between the member and the instrument will be carried on the folower bearing and the highly sensitive bearings will be relieved of wear.

Another object of this invention is to provide a novel and efficient repeater motor and novel and efficient light actuated control means therefor.

Other objects will be apparent from the following description taken in connection with the accompanying drawings.

Figure 1:
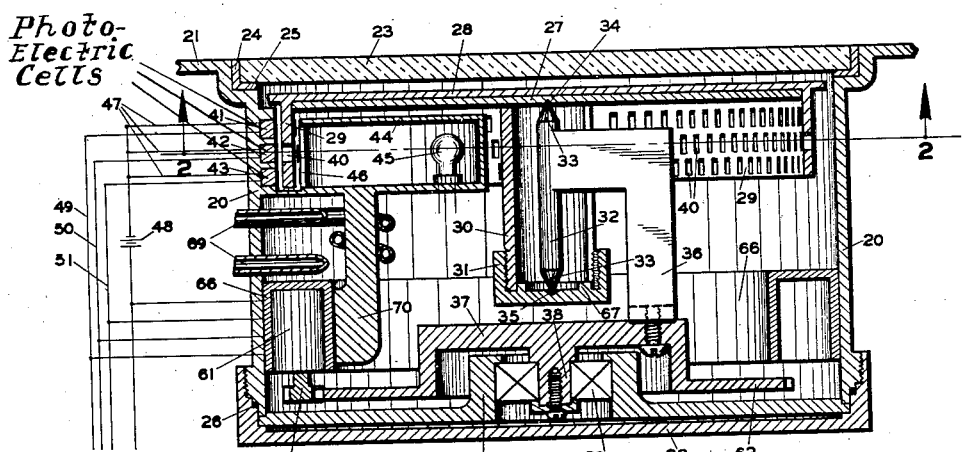
Fig. 1 is an axial sectional view of a magnetic compass constructed in accordance with this invention, certain electrical connections being shown diagrammatically.

Figs. 1 to 6 show a magnetic compass comprising a housing formed of a cylindrical shell 20 connected with a top flange 21 and having a removable bottom 22. A relatively strong heavy glass cover plate 23 is provided in the top of the housing. The cover plate 23 rests on a gasket 24 that is supported on a shoulder 25 of the housing.

A suitable gasket 26 provides a seal between the cylindrical shell 20 and the bottom member 22.

All housing parts are preferably non-magnetic and are airtight and the bottom member 22 and cover plate 23 are hermetically sealed around the edges by the gaskets 24 and 26 thus providing a chamber in which a vacuum may be drawn. The operating parts of the compass are mounted within this vacuum chamber.

The magnetically actuated part of the compass comprises a magnetic member 27 disposed within an inverted cup shaped member of non-magnetic material. Preferably the magnetic member 27 is of the usual bar or needle shape and corresponds to the magnetic needle of an ordinary compass. The non-magnetic cup shaped member is composed of a platelike end portion 28 and a cylindrical side wall portion 29. The side wall portion 29 forms a light shutter as hereinafter explained.

A tubular hub member 30 is secured to the end portion 28 of the cup shaped member axially thereof and extends downwardly therefrom at right angles to said end portion 28. The magnetic member 27, see Fig. 2, extends through hub member 30.

Figure 2:
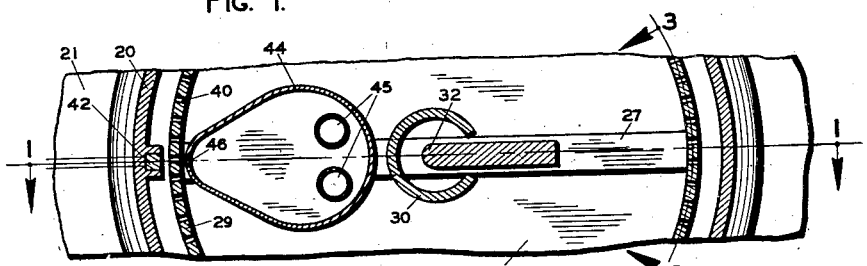
Fig. 2 is a fragmentary sectional view taken substantially on broken line 2—2 of Fig. 1.

The hub member 30 preferably has a cross sectional shape of substantially three quarters of a circle, as shown in Fig. 2. A screw cap 31 is provided on the bottom end portion of hub member 30. An internal flange 67 is preferably provided within screw cap 31 to prevent collapse of the hub section 30, when the cap is tightened thereon.

An upright bearing pin 32 is disposed within the hub member 30 coincident with the axis of the cup shaped member 28—29. The bearing pin 32 is relatively long and is tapered to a point at both ends to provide two needle point bearing members 33 that engage within suitable depressions 34 and 35 in the magnetic member 27 and cap 31 respectively and provide needle point bearings for the magnetically actuated parts of the compass to move on. These needle point bearings are spaced a substantial distance apart and are only called on to take care of a slight amount of movement as hereinafter explained and may be metal to metal bearings. However I prefer to make them jeweled bearings to eliminate substantially all friction and reduce wear to a minimum.

The needle point bearings 33 are subject to an exceedingly small amount of wear because the bearing pin 32 is part of a follower mechanism that starts to move rotatively with the magnetic member 27 and cap 31 immediately after these parts start to move.

The bearing pin 32 is supported by an L shaped bracket 36 that extends outwardly through the open side of the tubular hub 30 and thence downwardly and is secured to the top side of a gearwheel 37.

The gearwheel 37 has a rigid axle 38 that is journaled in a relatively strong and substantial bearing 39.

The bearing 39 is supported in a bracket or spider 68 that is rigid with the compass housing. Preferably the peripheral portion of the spider 68 is securely clamped between housing shell 20 and bottom member 22 as shown in Fig. 1.

Movement of the follower mechanism is controlled by the magnetic compass member 27 through photoelectric cells and beams of light arranged in such a manner that electric circuits are controlled by movement of said compass member 27 without any mechanical contacts being made directly by said compass member.

Figure 3:
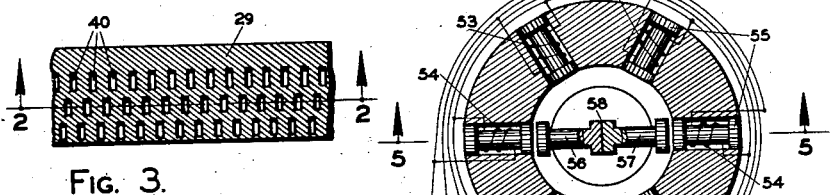
Fig. 3 is a fragmentary sectional development taken substantially on broken line 3—3 of Fig. 2 and showing a shutter ring for controlling light.

The shutter ring 29, Figs. 1, 2 and 3, has a plurality of light apertures 40 provided therein. I have shown a shutter ring 29 formed of material impervious to light and having light apertures 40 in the form of holes therein but obviously this shutter ring may be made of light conductive material painted or coated so as to leave light apertures in the form of light conductive sections instead of the holes 40.

I have shown three annular rows of the apertures 40 and have shown said apertures 40 to be offset relative to each other transversely of the shutter rings so that the apertures appear to be in slightly inclined rows transversely of the shutter ring. The relative positions of these apertures may be varied as long as an arrangement of said apertures is maintained so that light may pass through only one aperture at a time and may pass through said apertures in proper succession.

Three photo-electric cells 41, 42 and 43 are supported by the frame 20 in close proximity to the outer circumference of the shutter ring 29. One of the cells 41, 42 and 43 is positioned in alignment with each annular row of holes 40.

A source of light is positioned within the shutter ring 29 directly opposite the photo-electric cells 41, 42 and 43.

Preferably this source of light comprises a housing 44 having a plurality of lamps 45 therein and having a narrow upright slot 46 positioned close to the inside of the shutter ring 29 and directly opposite the photo-electric cells 41, 42 and 43.

The rear wall of the housing 44 is preferably of concave shape and the walls of said housing are mirrored so as to reflect the light forwardly and concentrate this reflected light at the location of the slot 46.

The photo-electric cells 41, 42 and 43 act as electric valves which permit a flow of electric current therethrough when a beam of light is incident thereon and shut off the flow of electric current when no light is incident thereon.

Each photo-electric cell 41, 42 and 43 is connected by a common circuit wire 47 with a source of supply of electric current, such as a battery 48. Also said photo-electric cells 41, 42 and 43 are connected by circuit wires 49, 50 and 51 with sets of coils 52, 53 and 54 of a repeater type electric motor shown diagrammatically in Figs. 4, 5 and 6. I have shown a repeater type electric motor with six equidistantly spaced pole pieces 55 each embodying a north pole and a south pole, see Fig. 5.

Figure 5:
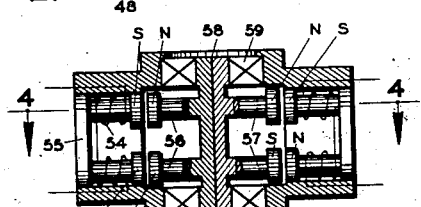
Fig. 5 is a fragmentary sectional view with parts in elevation taken substantially on broken line 5—5 of Fig. 4.

The sets of coils 52, 53 and 54 each consist of four coils disposed two each on diametrically opposite pole pieces, i. e., two of the coils 54 are wound in opposite directions on one pole piece 55, as shown in Fig. 5, and the other two coils 54 are wound in opposite directions on the diametrically opposite pole piece 55, see Fig. 5. Thus each pole piece 55 is provided with a north and south pole.

The rotary portion of the motor consists of two horseshoe type preferably permanent magnets 56 and 57 rigidly secured together in back to back relation and extending in opposite directions as shown in Fig. 5. A strip of insulating material 58 is provided between the two magnets 56 and 57. The magnets 56—57 are journaled in bearings 59 and have a gear pinion 60 connected therewith. Obviously the permanent magnets 56 and 57 may be electromagnets if desired.

The closing of the electric circuits through the sets of coils 52, 53 and 54 is controlled by the respective photo-electric cells 41, 42 and 43 and by movement of the cylindrical light shutter 29.

As the shutter 29 moves rotatively the light will fall on the photoelectric cells successively thus successively energizing the different sets of coils 52, 53 and 54. If the shutter ring 29 moves in one direction relative to the source of light, such as clockwise as respects the showing in Fig. 2 (this being equivalent to moving the shutter 29 to the left or the light source to the right as respects the showing in Fig. 3), then the photoelectric cells will be exposed in the order 43—42—

41 and the magnet coils will be energized in the order 54—53—52 and the device will repeat in this order as long as the shutter ring continues to move in the same direction. This will rotate the magnets 56 and 57 in a clockwise direction as respects Figs. 4 and 6.

If the shutter ring 29 moves in the opposite direction then the order in which the circuits through the coils will be closed will be reversed and the order in which the energizing of the coils will be repeated will be 52—53—54. This will rotate the magnets 56 and 57 counterclockwise as respects the showing in Figs 4 and 6.

Figure 4:
Fig. 4 is a somewhat diagrammatic view of a repeater motor taken on broken line 4—4 of Fig. 5.

The gearwheel 37 that carries the bracket 36 and bearing pin 32 is controlled by a repeater motor 61 of the type shown in Figs. 4 and 5. The motor 61 is positioned within the housing 20 and the gear pinion 60 of said motor is meshed with the gearwheel 37.

The repeater 61 is electrically connected with the photo-electric cells 41, 42 and 43 in such a manner as to always provide rotation of the follower mechanism in the same direction and at the same angular velocity as the magnetic member 27.

In this connection it is to be remembered that rotary movement of the magnetic member is a movement relative to the housing 20—21—22 and that the magnetic member really tends to remain in a fixed or magnetic north position while the housing moves rotatively relative to this member.

When relative movement in one direction between the housing and the magnetic member starts it will only have to move the shutter ring 29 far enough to obstruct the light from one photo-electric cell and allow light to fall on the next cell to cause the follower mechanism to start to follow the movement of the magnetic member. As long as the relative movement between the housing and the magnetic member continues the follower mechanism will move with the magnetic member and the rotary movement will take place on the bearing 39 thereby relieving the more delicate bearings 33—34 of substantially all wear. When the magnetic member comes to rest relative to the housing the follower mechanism will also come to rest.

If the relative direction of movement of the magnetic member and housing is reversed the follower mechanism will follow it in the opposite direction.

Slight variations or fluctuations of the magnetic member are taken care of on the needle point or jewel bearings 33—34 without starting operation of the follower mechanism.

To obviate all possibility of the magnetic member 27 being influenced by electromagnetic lines of force emanating from the motor 61 I preferably provide a shield for this motor such as an annular soft iron housing 66 of inverted U shape in cross section. This housing 66 is coaxial relative to the magnetic member 27 so that if any magnetism emanates from the motor 61 it will be uniformly distributed by the housing 66 and will not cause any deviation of the magnetic member 27.

As the lamps 45 and electric motor 61 will necessarily give off some heat and as a vacuum is preferably drawn within the compass housing I preferably provide cooling means for taking care of this heat. This cooling means preferably consists of a cooling-liquid conduit 69 which extends through the walls of the housing member 20 and is coiled about a metal bracket 70. The metal bracket 70 is of high thermal conductivity and is connected with both the motor 61 and the lamp housing 44 so that heat from both the motor 61 and housing 44 are drawn off rapidly.

The conduit members 69 are brazed or otherwise sealed where they pass through the wall of housing member 20.

Disc 28 represents a conventional compass card visible through the glass cover plate 23 to give the desired compass readings.

Permanent adjustment between the disc 28 and magnetic member 27 may be made at the time the compass is assembled to take care of any magnetic deviation which might otherwise exist. No means is shown herein for correcting for magnetic declination and allowance will have to be made for the declination between the magnetic readings and the true readings in each location where the compass is used.

Figure 6:
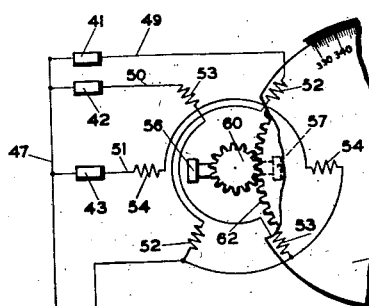
Fig. 6 is a diagrammatic view of repeater mechanism showing parts thereof in plan.

Fig. 6 is a diagrammatic view of repeater mechanism using the motor shown in Figs. 4 and 5 for operating a dial which may be located at a point remote from the compass shown in Fig. 1.

In said Fig. 6 the photoelectric cells 41, 42 and 43 and circuit wires 47, 49, 50 and 51 and coils 52, 53 and 54 and magnets 56 and 57 are all shown diagrammatically. The pinion 60 which is connected with the magnets 56 and 57 meshes with a gearwheel 62.

The gearwheel 62 has a dial 63 secured thereto. The dial 63 has suitable graduations thereon and these graduations may be read with respect to any suitable fixed mark on the frame that surrounds the dial.

The ratio of the gears 60 and 61 is preferably such as to provide movement of the repeater dial 63 in exact synchronism with the movement of the disc or dial member 28.

Obviously as many repeaters of the type shown in Fig. 6, may be provided as are desired.

*Operation*

The operation of the several parts of the device shown in Figs. 1 to 6 have been explained in the foregoing description and the joint operation of these parts may be summarized as follows:

The device is placed on any air or water vehicle in the usual manner and usually in the upright position shown in Fig. 1. The magnetic member 27 will seek a position in which it will point to the magnetic North. This magnetic member will always be free to move on the needle point or jeweled bearings which offer the least possible amount of frictional resistance. Immediately after the magnetic member 27 starts to move relative to the housing, the circuits to the magnet coils of the repeater motor 61 are successively closed and the follower mechanism starts to follow the magnetic member so that there is no further movement on the needle point or jeweled bearings at all.

If the magnetic member slows down or stops or reverses its direction of movement the follower mechanism does the same thing, as it is controlled by the passage of light through the openings 40 in the shutter 29 and the shutter 29 is controlled by the magnetic member 27.

The compass is thus very accurate and very reliable and very durable. The bearing 39 that carries the follower mechanism is strong and substantial and will last indefinitely. The bearings on which the magnetic member depends for its sensitivity are substantially frictionless and are only subjected to a very slight amount of wear.

The repeater mechanism is controlled by the magnetic member without any actual contact of moving parts and for this reason does not detract from the sensitivity of the magnetic member. The repeater motors that are controlled by the photo-electric cells derive their current from an external source and are reliable and efficient. As many of these repeater motors as may be desired can be operated from a single set of photo-electric cells.

The mechanism is all sealed in a substantial vacuum thereby safeguarding this mechanism against dirt in all forms, moisture and corrosion. Also sealing this mechanism in a vacuum safeguards it against the action of air currents.

In Figs. 1 and 2 I have shown a light housing that does not have any lenses therein. It will be understood that all lenses may be omitted from a light housing of this nature or that one or more lenses may be used therein to focus the light on the photo-electric cells. Lenses, when used, concentrate the light and render the device more efficient.

Figure 7:
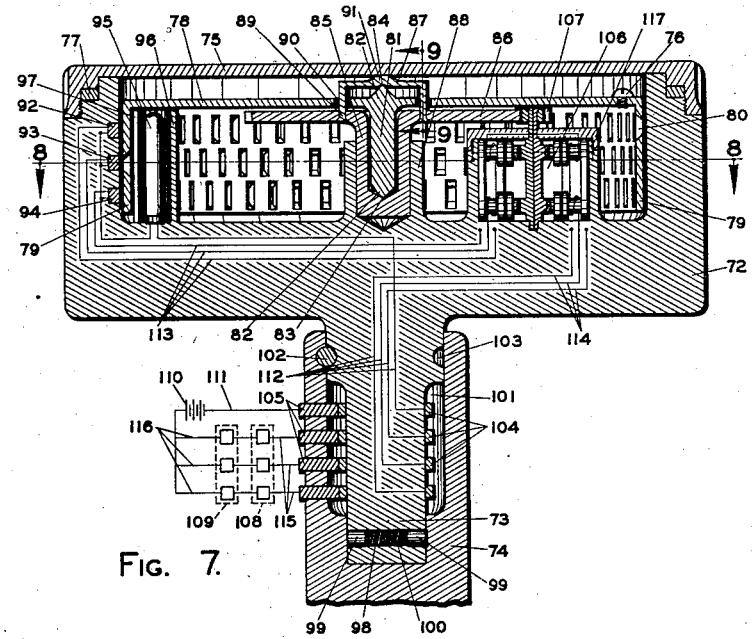
Fig. 7 is a vertical sectional view taken substantially on broken line 7—7 of Fig. 8 and with parts shown diagrammatically showing an inertia device constructed in accordance with this invention which device has automatic control means connected therewith and is adapted to be used for steering purposes or as a stabilizer to correct tilt and inclination.
Figure 8:
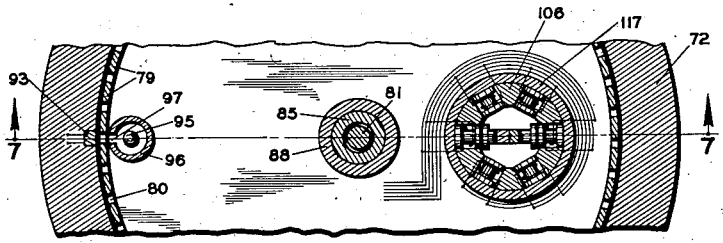
Fig. 8 is a sectional view taken substantially on broken line 8—8 of Fig. 7, parts being shown in plan.
Figure 9:
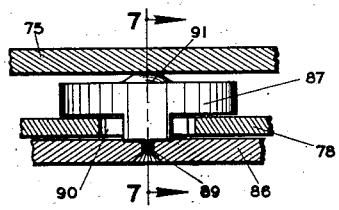
Fig. 9 is a fragmentary sectional view with parts in elevation, taken substantially on broken line 9—9 of Fig. 8.

Figs. 7, 8 and 9 show an inertia device that operates in a manner similar to the master compass shown in Figs. 1, 2 and 3 except that it is controlled by inertia instead of by the earth's magnetism.

The inertia device shown in Figs. 7, 8 and 9 comprises a cup shaped housing 72 having an axial stem 73 extending from one end portion thereof and supported in bracket means 74 by which it is frictionally held in such a manner that it may be rotatively moved in the bracket means but will move rotatively with the bracket means unless it is restrained.

The housing 72 has a cover plate 75, preferably of metal, threaded onto one end portion thereof and sealed by a gasket 77 to provide a receptacle that is air and moisture tight.

The interior of the housing is preferably evacuated of air to obviate air resistance, corrosion and moisture. However this housing may be filled with an inert gas if desired.

The mechanism in the housing 75 comprises an inverted cup shaped inertia member composed of a disc shaped upper end portion 78 and a cylindrical light control portion 79 having light apertures 80 therein.

The parts 78, 79 and 80 are similar to the corresponding parts 28, 29 and 40 of the inverted cup shaped member shown in Figs. 1 to 3 and operate in a similar manner except that they are governed by inertia instead of being governed by the earth's magnetism.

The inverted cup shaped member 78—79 is provided with an axially positioned integral stem portion 81 having two tapered end portions 82 forming needle bearings. These needle bearings are seated in properly formed recesses 83 and 84 respectively in the tubular hub portion 85 of a gearwheel 86 and in a cap member 87.

The hub portion 85 of gearwheel 86 is journaled in a bearing boss 88 that is rigid with the housing 72.

The cap member 87 does not touch the inverted cup shaped member 78—79 except at the location of the needle bearing 84. The portion of said cap member 87 above the disc like end portion 78 of the cup shaped member is preferably cylindrical. The lower end of said cap member, see Fig. 9, is provided at two or more locations with shouldered leg members 89 that extend through slots 90 in disc member 78 and are secured to the gearwheel 86, as by passing them through holes in the gearwheel and riveting or upsetting them, see Fig. 9.

The cap 87 thus becomes a fixed part of the gearwheel 86 and cooperates in providing an efficient support for the needle bearings of the stem 81.

A bearing element 91 on the outer end portion of the cap 87 abuts lightly against the cover plate 75 so as to prevent endwise displacement of the gearwheel 86 and cap 87, and at the same time leave the gearwheel 86 and cap 87 free to be turned as hereinafter explained.

The annular rows of light apertures 80 in the cylindrical member 79 are positioned in alignment with three photo-electric cells 92, 93 and 94 that are similar to, and function in the same manner as the previously described cells 42, 43 and 44.

A lamp 95, herein shown to be of a long tubular type, is provided within a housing 96 and adapted to direct light outwardly through a slot 97 in said housing 96. The slot 97 is positioned crosswise of the slotted cylindrical member 79. The housing 96 and lamp 95 are rigid with the main housing 72 and the cells 92, 93 and 94 are carried by this main housing.

The apertures or light conductive portions 80 of the cylinder 79 are arranged in inclined rows transversely of said cylinder 79 and operate in the same manner as the hereinbefore described slots 40 of cylindrical member 29 to control the light which falls on cells 92, 93 and 94. Thus relative angular motion in one direction between light control cylinder 79 and housing 72 will repeatedly actuate the cells in the sequence 92, 93, 94, while relative angular movement in the opposite direction between these two parts will repeatedly actuate these cells in the sequence 94, 93, 92.

The stem 73 of housing 72 is rotatably supported in the bracket 74 but is frictionally bound therein to such an extent that the bracket 74 and housing 72 will ordinarily move angularly or rotatively together.

One means for insuring friction between these two parts is to provide in the stem 73 a transverse bore 98 having therein two friction blocks 99 urged outwardly against the wall of the bracket 74 by a compression spring 100.

Preferably the housing 72 can be readily turned manually relative to the bracket 74.

Preferably the stem 73 and the receptacle therefor in the bracket 74 are shaped so as to provide an annular chamber 101 to facilitate electrical connections.

A pin 102 operating in an annular groove 103 in the stem 73 holds stem 73 and bracket 74 in assembled relation.

Preferably four conductor rings 104 are provided on the stem 73 within the chamber 101.

An equal number of brushes 105 extend through the wall of bracket 74 and engage with the conductor rings 104.

A repeater motor 106 of the type disclosed in Figs. 4 and 5 is provided within a motor housing 117 in the main housing 72. As both the structure and the operation of this repeater motor have been fully described in connection with Figs. 1 to 6 it will be understood that said previous description applies equally well to Figs. 7 and 8 and it will not be necessary to repeat the same.

A pinion 107 on the repeater motor in housing 117 meshes with the gearwheel 86 for the purpose of driving the same.

The repeater motor in the housing 117 is preferably connected in series with two other similar repeater motors 108 and 109, which are diagrammatically shown in Fig. 7. The repeater motors 108 and 109 may be positioned at any suitable locations and are connected with any suitable controlling means.

A source of power as represented by a battery 110 is provided.

One side of the source of power 110 is connected by conductor means 111 and 112 and through one brush 105 and ring 104, and through the lamp 95 with the three photo-electric cells 92, 93 and 94.

The three cells 92, 93 and 94 are, in turn, respectively connected with corresponding pairs of coils of the repeater motor 106 and the two repeater motors 108 and 109. This last connection may be traced from cells 92, 93 and 94 along conductors 113, through the three pairs of coils of the repeater motor 106, along conductors 114, through three of the rings 104 and three of the brushes 105, along conductors 115, through the three pairs of coils of each of the repeater motors 108 and 109 and along conductors 116 to the other side of the source of power 110.

This completes parallel circuits through the three repeater motors 106, 108 and 109 so that the rotors of said motors will always move in the same direction at the same speed and thus operate in synchronism.

The inertia device shown in Figs. 7, 8 and 9 may be operated in any position, i. e., it may be positioned with its axis vertical or horizontal or at an incline.

For some uses, and particularly where this device is to be positioned with its axis in a generally horizontal direction and it is used for controlling the bank or fore and aft tilt of an aircraft, it is desirable to very, very slightly unbalance the weight of the inverted cup-shaped member 78—79 enough so that gravity will very, very gradually tend to keep this member 78—79 in one position. This may be done by providing a separable weight 76 of very small size that is adapted to be detachably secured to the disc member 78 preferably near the periphery thereof. I have shown this weight attached to the disc member 78 in Fig. 7 but said weight would preferably only be used when this device is employed for controlling the bank or fore and aft tilt of an aircraft.

Preferably the weight of the inverted cup member 78—79 is very accurately and evenly balanced statically when the weight 76 is absent therefrom. In the absence of said weight 76 this member will operate as a statically balanced inertia device regardless of the position of the housing 72. If this device is to be used for steering an aircraft or for stabilizing it against orientation the weight 76 is preferably omitted and magnetic compass means such as part 27 of Figure 1 is preferably used.

If the device is to be used for steering purposes the housing 72 is preferably mounted on a substantially vertical axis. When so mounted the inverted cup shaped member, being mounted on substantially frictionless bearings, will remain rotatively immovable, due to its own inertia, but the bracket 74, which is fixed to the aircraft, and the housing 72 which is frictionally bound to the bracket 74 will move rotatively with the aircraft.

With such a set up, if the aircraft deviates from a straight course, while in flight, the housing 72, which carries both the light source 95 and the light responsive cells 92, 93 and 94 will start to move rotatively relative to the cylindrical member 79 and this will start operation of the repeater motor 106 and simultaneously will start operation of the repeater motors 108 and 109.

When the housing 72 first begins to move rotatively, the gearwheel 86 will begin to move with it and there will be a very slight movement in the needle bearings 82—83—84. However it only requires a very slight amount of rotary movement of the housing 72 relative to the inertia member 78—79 to start operation of the repeater motor 106. As soon as the operation of this repeater motor 106 is started the gearwheel 86 will be maintained rotatively immovable relative to the inertia member by rotary movement of the pinion 107, which is driven by repeater motor 106, and further turning movement of the housing 72 relative to the inertia member 78—79 will be accommodated in the strong and rugged bearing between the hub 85 and bearing boss 88. Thus the delicate needle bearings 82—83—84 are relieved of substantially all wear.

The slots 90 in the disc member 86 allow for the very slight rotary movement in either direction of the housing 82 relative to the inertia member 78—79 that is necessary to start operation of the repeater motor 106. This very slight rotary movement is the only movement that is accommodated by the needle bearings 82—83—84 and consequently the wear on these needle bearings is very slight.

Also this very slight rotary movement needed to start operation of the repeater motor 106 is the only relative rotary movement that will occur between the inertia member 78—79 and the gearwheel 86 because otherwise the gearwheel 86 will always be actuated by the repeater motor 106 in such a manner as to keep it in synchronism with the inertia member 78—79, i. e., except for this slight initial relative movement these two parts 78—79 and 86 will always both remain stationary or both move together at the same rate of speed.

The repeater motors 108 and 109 will operate in synchronism with the repeater motor 106 and will be connected with any suitable control means, such as means to steer or stabilize the aircraft.

If the housing 72 is manually turned rotation of the spindle 73 within the bracket 74 will occur but the inertia member 78—79 will not be moved. Also the repeater motor 106 will begin to operate the instant that rotary movement of the housing 72 commences and this operation will continue until said rotary movement of said housing ceases. Simultaneously the other repeater motors 108 and 109 will be operated and will cause operation of the aircraft controls that are connected therewith. Thus an aircraft that is equipped with this device may be steered in any desired direction by manually turning the housing 72 and after said aircraft has been headed in any direction this inertia device will automatically hold said aircraft on its course.

In a similar manner this device can be used to steer a boat through the water.

When one of these inertia devices is to be used as a stabilizer to control the longitudinal tilt or inclination of an aircraft the weight 76 is omitted from the inertia member 78—79 and the housing 72 is mounted with its axis transverse to the aircraft and preferably so that said axis will be substantially horizontal when the aircraft is level transversely considered.

When one of said inertia devices is to be used as a stabilizer to control the bank or transverse tilt or inclination of an aircraft the inertia member 78—79 thereof will preferably but not essentially have one of the weights 76 secured thereto and the housing 72 will be mounted with its axis longitudinally of the aircraft and preferably so that its said axis will be substantially horizontal when the aircraft is level longitudinally considered.

Thus for controlling both longitudinal tilt and transverse tilt or bank I provide, on an aircraft, two of these inertia devices positioned with their axes at right angles to each other. This makes a total of three devices on an aircraft for steering and completely stabilizing the same.

The stabilizing device that is used for controlling the bank or side tilt of the aircraft is positioned with its axis longitudinally of the aircraft and is preferably but not essentially provided with one of the weights 76. When one of said weights 76 is so used on this stabilizer it will have a steady and constant, though very light, gravitational tendency toward the earth, that will act constantly, and over all intervals of time to average out momentary sidewise displacing centrifugal impulses produced by turns that haphazardly take place first in one direction and then the other. This weight should be so light in comparison to the mass of the inertia element 78—79 as to produce a very inferior pendulous action on turns. The less this pendulous action, the better, and hence the lighter this weight the better, so long as its constant gravitational pull is effective to prevent said inertia element from acquiring rotation due to the possibility of the frictional drag of the delicate pivot bearings being greater in one direction than in its averaged out equalizing movement in the other. Should the tilts to the left be quicker than the tilts to the right, a gradual tendency to rotate to the right would be acquired by said inertia member, for while the movements would average out to be of equal angular extent and frictional resistance in both directions the time element of such tilts would thus give a gradual tendency of the inertia element to rotate in the direction of the slowest movement.

Hence it is important to provide a weight on said inertia element light enough to reduce the momentary centrifugal displacement on curves, to the lowest possible point, and at the same time provide a weight heavy enough so that its constant response to gravity will prevent said inertia member from setting up a rotary motion due to the rotative driving force of the friction of its very delicate and almost frictionless bearings due to the possible difference of time of left and right turns.

The rotation of the propeller and gyroscopic action thereof makes the time elements of right and left turns different and hence the slow frictional pull one way will out motivate the inertia member against the fast frictional pull of equal intensity and distance in the other direction. In other words, there is less frictional slip in the slow movements than in the faster ones.

This weight prevents this unequal frictional motivation, of promiscuous left and right turns in maneuvering, of the inertia member from gradually setting it rotating, and keeps the inertia member in a more or less stable relation with the weight pointing roughly and varyingly towards the earth's center.

Thus, while we cannot get away entirely from the objectional centrifugally induced pendulous action, it can be reduced, however, to a minimum by keeping the said part 75 down to a minimum weight.

It is not to be expected that this device used as a fore and aft or sidewise tilt stabilizer will keep the aircraft exactly level or provide the craft with properly banked turns but its automatic action will be a compromise between these conditions which, supplemented by manual readjustment from time to time, will aid the operator to keep his craft exactly level while flying straight and to provide an aid in producing properly banked turns also by compensating manual readjustments.

When the weight is not used and a slow rotary motion is induced as explained, the craft is held level or banked on turns by a more or less constant compensating manual over-control.

The stabilizer that is positioned with its axis horizontal and transverse to the aircraft and that is used to stabilize the craft against fore and aft tilts will do a much better job of automatic stabilization than the one positioned with its axis horizontal and longitudinal of the aircraft and that is used to stabilize the craft against sidewise tilts, for the centrifugal displacements due to curved flight is eliminated and the weight 75 points more steadily towards the center of the earth at all times requiring less manual readjustment to any slight deviation therefrom resulting from the craft hitting air pockets, etc.

The repeater motors 108 and 109 are connected with any suitable type of stabilizing devices for stabilizing and controlling the tilt and bank of the aircraft.

The bearings 82—83—84 that support the inertia member 78—79 are as near frictionless as they can be made and turning movement of the housing 72 will not have any appreciable tendency to turn the inertia member but said inertia member will for the most part remain in the position in which it comes to rest.

When two of these devices are used as stabilizers they may be set by manually moving the housings 72 rotatively to provide any desired flight condition of the aircraft as respects climb or dive or glide or bank or level flight and said devices will automatically maintain approximately the same flight condition until they are manually changed.

When an aircraft that is equipped with these inertia devices is in flight there will be times when the pilot will be able to tell, as by observation, whether or not said aircraft is level and free from longitudinal and transverse tilt. At such times the housings 72 may be manually turned to correct for any errors that may have arisen due to variations in the positions of the inertia members. If such errors do develop they will be slight and easily corrected.

It will be understood that the inertia device herein disclosed may also be used for stabilizing and guiding submarines and for guiding surface ships on the water.

Having described my invention what I claim as new and desire to protect by Letters Patent is, 1. In an instrument of the class described, a light source, a plurality of photoelectric cells fixed relative to said light source and positioned to receive light therefrom, a light shutter positioned between said light source and said photoelectric cells and having a plurality of apertures positioned to successively expose successive cells to light, said photoelectric cells and light source and said light shutter being movable relative to each other; and a repeater motor having successive pole pieces connected in successive order with said photoelectric cells.

2. In an instrument of the class described, a light source adapted to deliver a blade of light, a plurality of photoelectric cells fixed relative to said light source and positioned in alignment with said blade of light, a light shutter positioned between said light source and said photoelectric cells and movable relative thereto, said light shutter having a plurality of rows of light apertures positioned with a row of light apertures in alignment with each photoelectric cell, said light apertures and blade of light being relatively positioned so that said blade of light will pass through light apertures in successive rows and will only pass through one light aperture at a time as a result of relative movement between said light blade and said light shutter, and a repeater motor controlled by said photoelectric cells.

3. In an instrument of the class described, a light source adapted to deliver a blade of light, a plurality of photoelectric cells fixed relative to said light source and positioned in alignment with said blade of light, a cylindrical light shutter positioned between said light source and said photoelectric cells and movable relative thereto, said light shutter having a plurality of annular rows of light apertures therein positioned with one annular row of light apertures in alignment with each photoelectric cell, said blade of light extending across said annular rows of light apertures and the light apertures of the different annular rows being offset so that light from said light blade will successively pass through light apertures in successive annular rows and will only pass through one light aperture at a time as a result of relative movement between said light shutter and said light source and cells, and a repeater motor controlled by said photoelectric cells.

4. In an instrument of the class described, a movable member, highly sensitive bearings supporting said movable member, follower means supporting said highly sensitive bearings, a repeater motor operatively conected with said follower means, a plurality of photoelectric cells carried by said follower means and connected in successive order with the poles of said repeater motor, and lamp means carried by said follower means positioned to direct light toward said cells, said movable member having shutter means connected therewith and provided with apertures positioned to successively expose said cells to thereby control the operation of said repeater motor.

5. In an instrument of the class described, a magnetic needle, highly sensitive bearings supporting said magnetic needle, follower means supporting said bearings arranged to follow angular movement of said magnetic needle whereby friction and wear on said highly sensitive bearings will be reduced to a minimum, a repeater motor operatively connected with said follower means, a plurality of photoelectric cells connected in successive order with the poles of said repeater motor, lamp means positioned to direct light toward said cells, and shutter means connected with said magnetic needle and having apertures positioned to successively expose said cells to light to thereby control the operation of said repeater motor.

6. In an instrument of the class described, a light source adapted to deliver a blade of light, a plurality of photoelectric cells fixed relative to said light source and positioned in alignment with the blade of light, a magnetic needle, highly sensitive bearings supporting said magnetic needle, a light shutter connected to move with said magnetic needle and positioned between said light source and said photoelectric cells, said light shutter having light apertures therein positioned to expose said cells in successive order, follower means supporting the bearings of said magnetic needle, and a repeater motor having pole pieces connected in successive order with said photoelectric cells and controlled by said photoelectric cells connected to move said follower means when relative movement occurs between said light shutter and said photoelectric cells and light source.

7. In a compass, a magnetic needle, a light shutter connected with said magnetic needle and movable therewith and having light apertures therein, a plurality of photoelectric cells positioned at one side of said light shutter, a source of light positioned at the other side of said light shutter and having a light opening directed toward said photoelectric cells, said photoelectric cells and said source of light being fixed relative to each other and said light shutter being movable therebetween and having its light apertures positioned to expose said cells in successive order, a repeater motor having pole pieces connected in successive order with said photoelectric cells controlled by relative angular movement between said light shutter and said light source and photoelectric cells, and indicator dial means operated by said repeater motor.

8. In an instrument of the class described, a light source providing a blade of light, a plurality of photoelectric cells fixed relative to said light source and positioned in alignment with the blade of light, an inertia member, highly sensitive bearings supporting said inertia member, a light shutter carried by said inertia member and positioned between said light source and said photoelectric cells, said light shutter having light apertures therein positioned to expose said cells to light in successive order, follower means supporting the bearings of said inertia member, and a repeater motor having pole pieces connected in successive order with said photoelectric cells and controlled by said photoelectric cells said motor being connected to said follower means for moving said follower means when relative movement occurs between said light shutter, and said photoelectric cells and light source.

9. In an instrument of the class described, an electrically operated repeater motor having a plurality of pole pieces positioned around a rotor, a plurality of photoelectric cells connected in successive order with successive pole pieces of said repeater motor, lamp means positioned to direct light toward said cells, and shutter means having apertures positioned to successively expose said cells whereby said rotor will be moved a step each time an aperture exposes a cell.

FRANK ELLISON BEST.